(12) United States Patent
Minami et al.

(10) Patent No.: US 7,979,526 B2
(45) Date of Patent: Jul. 12, 2011

(54) CONNECTION MANAGEMENT SYSTEM AND METHOD FOR A TRANSPORT OFFLOAD ENGINE

(75) Inventors: John Shigeto Minami, Honolulu, HI (US); Michael Ward Johnson, Livermore, CA (US); Robin Yasu Uyeshiro, Kailua, HI (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 12/649,221

(22) Filed: Dec. 29, 2009

(65) Prior Publication Data

US 2010/0106840 A1 Apr. 29, 2010

Related U.S. Application Data

(62) Division of application No. 10/742,358, filed on Dec. 19, 2003, now Pat. No. 7,899,913.

(51) Int. Cl.
*G06F 15/173* (2006.01)
(52) U.S. Cl. .......................... 709/223; 709/224; 709/227
(58) Field of Classification Search .................. 709/223, 709/224, 227, 203, 217, 219
See application file for complete search history.

(56) References Cited

U.S. PATENT DOCUMENTS

| | | | | |
|---|---|---|---|---|
| 7,269,654 B2 * | 9/2007 | Srinivas | ......................... | 709/227 |
| 7,698,413 B1 * | 4/2010 | Minami et al. | ................ | 709/224 |
| 7,899,913 B2 | 3/2011 | Minami et al. | | |
| 2002/0165992 A1 * | 11/2002 | Banerjee | ......................... | 709/315 |
| 2004/0199793 A1 * | 10/2004 | Wilken et al. | ................ | 713/201 |
| 2005/0027872 A1 * | 2/2005 | Srinivas | ......................... | 709/227 |
| 2005/0122886 A1 * | 6/2005 | Takahashi et al. | ............ | 369/126 |
| 2005/0138180 A1 * | 6/2005 | Minami et al. | ................ | 709/227 |
| 2005/0182841 A1 * | 8/2005 | Sharp | ............................ | 709/228 |
| 2005/0278459 A1 * | 12/2005 | Boucher et al. | ............... | 709/250 |
| 2007/0061470 A1 * | 3/2007 | Berg | ............................ | 709/227 |
| 2010/0023626 A1 * | 1/2010 | Hussain et al. | ............... | 709/227 |

OTHER PUBLICATIONS

Notice of Allowance from U.S. Appl. No. 10/742,358, dated Sep. 28, 2010.
Notice of Allowance from U.S. Appl. No. 10/742,358 mailed on Jun. 18, 2010.
Supplemental Notice of Allowability from U.S. Appl. No. 10/742,358 mailed on Aug. 10, 2010.
Chinese Office Action from application No. 200410104981.0 dated Aug. 9, 2010 (no translation).

* cited by examiner

*Primary Examiner* — Lashonda T Jacobs
(74) *Attorney, Agent, or Firm* — Zilka-Kotab, PC

(57) ABSTRACT

A system and method are provided for establishing network connections. Initially, an attempt to establish a connection on a network is identified. A portion of memory is then allocated for storing data associated with the connection.

20 Claims, 10 Drawing Sheets

CONNECTION MANAGEMENT SYSTEM AND METHOD FOR A TRANSPORT OFFLOAD ENGINE

RELATED APPLICATION(S)

This application is a divisional U.S. patent application Ser. No. 10/742,358, now U.S. Pat. No. 7,899,913 Dec. 19, 2003, which is incorporated herein by reference in its entirety.

FIELD OF THE INVENTION

The present invention relates to managing network communications, and more particularly to network connection management.

BACKGROUND OF THE INVENTION

Prior art FIG. 1 illustrates a method 100 by which network communications are established, in accordance with the prior art. Network communications (i.e. Internet communications, etc.) utilizing various protocols (TCP, etc.) often begin with an effort to establish a connection.

When a TCP connection attempt begins, a destination host receives a synchronize (SYN) packet from a source host, as indicated in operation 102. In response to receiving such SYN packet, a designated memory, typically of finite size, is allocated to track the establishment of the connection. Note operation 103.

Thereafter, in operation 104, the destination host sends back a SYN acknowledgement packet (SYN/ACK). The destination host must then wait for receipt of a handshake ACK before the connection is established, as set forth in decision 106. This is typically referred to as the "TCP three-way opening handshake."

While waiting for the handshake ACK, the memory of finite size on the destination host keeps track of other connections waiting to be completed. This queue typically empties quickly since the handshake ACK is expected to arrive a few milliseconds after the SYN/ACK packet is transmitted.

Upon receipt of the handshake ACK, the connection is open and the associated portion of the finitely sized memory is used for tracking and maintaining the now open connection. Note operation 110. On the other hand, if the handshake ACK is not received within a predetermined timeout period (note decision 108), a test is made to determine if the maximum number of SYN/ACK retransmissions has occurred (note decision 112). If the maximum number of retransmissions has not yet occurred, the SYN/ACK packet is retransmitted. Note operation 114. If the maximum number of retransmissions has occurred, the process is ended and the memory is de-allocated. Note operation 116.

A denial-of-service (DoS) attack exploits this design by having an attacking source host generate TCP SYN packets with random source IP addresses and source ports toward a victim destination host. The victim destination host then sends a SYN/ACK packet back to the random source address (in accordance with operation 104 of the method 100 of FIG. 1) and adds an entry to the connection queue of the memory.

Since the SYN/ACK packet is destined for an incorrect or non-existent host, the last part of the "three-way opening handshake" is never completed, the memory remains allocated to the connection attempt, and the entry remains in the connection queue until the maximum number of retries has been transmitted and the timer expires, typically for about one minute. By generating phony TCP SYN packets from random addresses at a rapid rate, it is possible to fill up the connection queue of the memory and deny TCP services (such as e-mail, file transfer, WWW, etc.) to legitimate users.

There is no easy way to trace the originator of the attack because the IP address of the source is typically forged. There is thus a need for a more effective technique of managing network connection attempts in a manner that avoids the ramifications of network overload due to these and other factors.

SUMMARY OF THE INVENTION

A system and method are provided for establishing network connections. Initially, an attempt to establish a connection on a network is identified. A portion of memory is then allocated for storing data associated with the connection.

In one embodiment, the portion of the memory may be overwritten if a second attempt to establish a connection has at least one aspect associated with the previous attempt. Such aspect may include any aspect of the connection including, but not limited to an IP address, a TCP port, etc.

Optionally, each attempt to establish the connection on the network may be identified utilizing a packet [i.e. a synchronize (SYN) packet, etc.]. Still yet, the system and method may respond to the packet with a synchronize/acknowledgment (SYN/ACK) packet.

In another embodiment, a hash may be generated in association with each packet corresponding with an attempt to establish the connection on the network. Such hash may, in turn, be utilized to determine whether the second attempt to establish the connection has at least one aspect associated with the previous attempt, in the aforementioned manner.

Still yet, the hash may serve as a pointer to the data stored in the portion of the memory, where the data includes a control block. Optionally, a plurality of control blocks associated with connections in the half open state may be smaller in size with respect to a plurality of control blocks associated with open connections. Further, the control block may include a handle used to identify the connection, IP addresses, port numbers, a timestamp, etc. A half open state is defined as a connection attempt where the first SYN has at least been received from a remote host, but the corresponding handshake ACK has not yet been received.

In still yet another embodiment, the memory may include a first memory for being allocated for the data associated with half open connections. Moreover, a second memory logically or physically separate from the first memory may be allocated for data associated with open connections so that an overload of the first memory does not affect the open sockets. Optionally, as mentioned previously, the second memory may be allocated for a second-type of control block that is larger in size with respect to a first-type of control block for which the first memory is allocated.

In use, the portion of the memory may be de-allocated, upon receipt of a handshake ACK of the connection attempt. Still yet, a portion of another memory (i.e. the second memory, etc.) may be allocated for an open connection, upon the connection attempt being successful.

BRIEF DESCRIPTION OF THE DRAWINGS

Prior art

DETAILED DESCRIPTION

Figure 1:
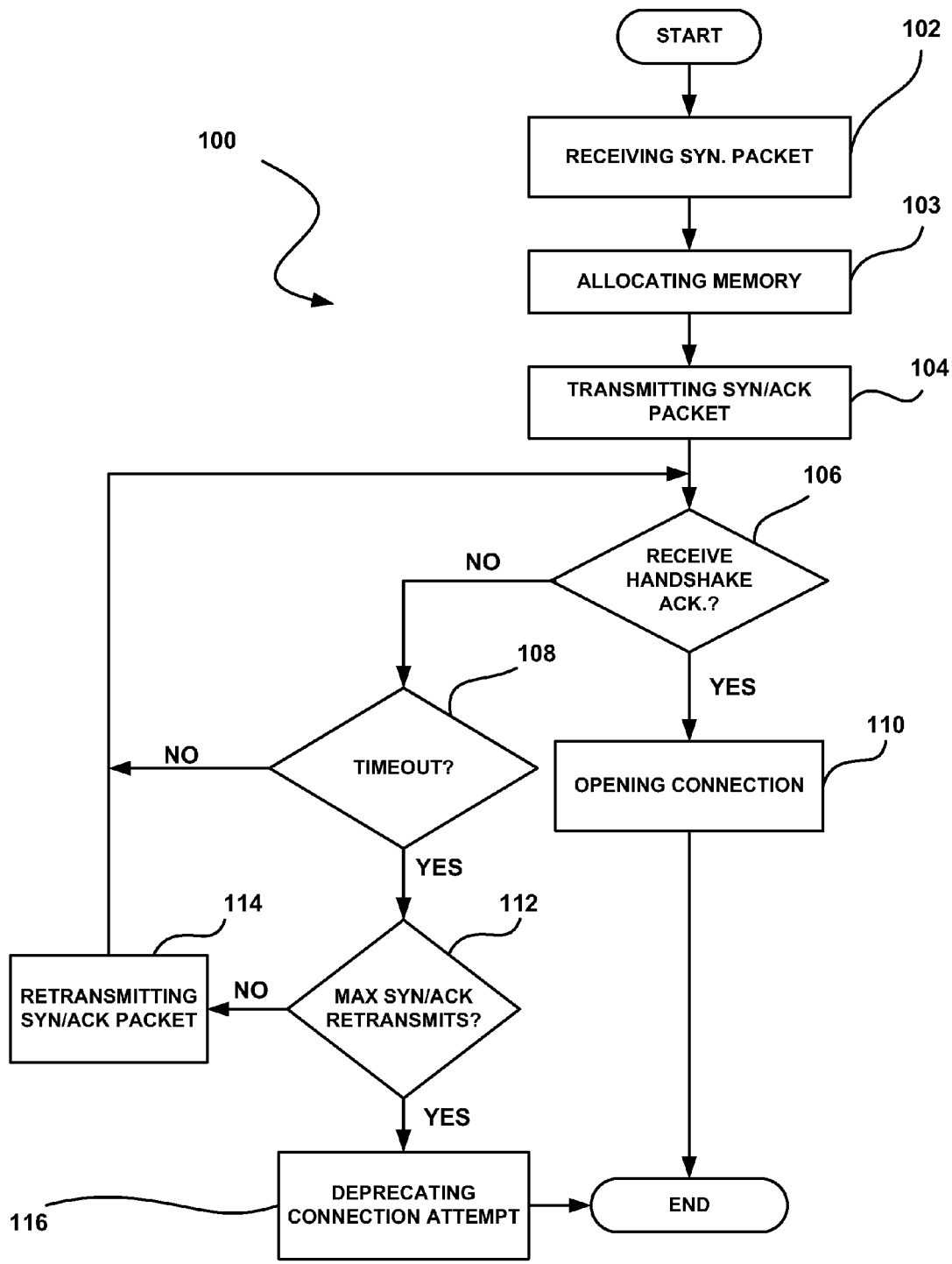
FIG. 1 illustrates a method by which network communications are established, in accordance with the prior art.
Figure 2:
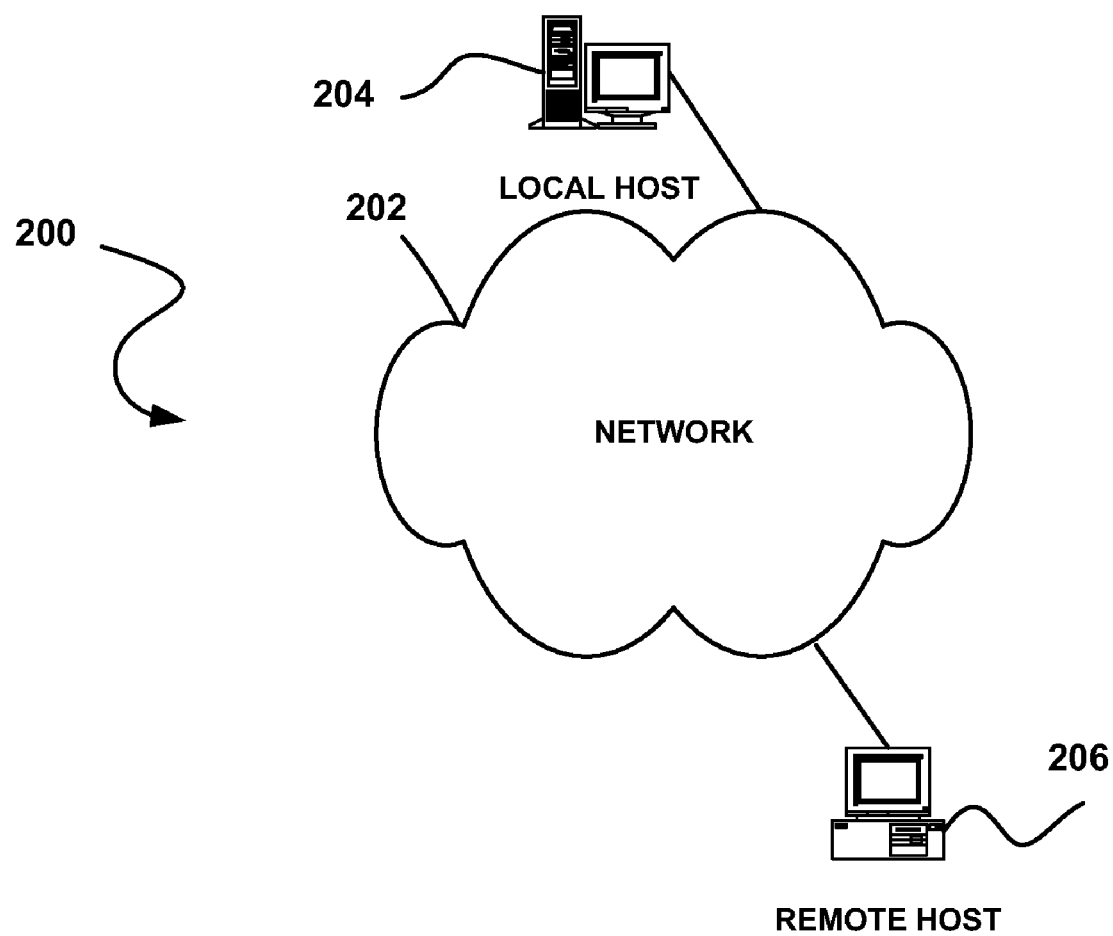
FIG. 2 illustrates a network system, in accordance with one embodiment.

FIG. 2 illustrates a network system 200, in accordance with one embodiment. As shown, a network 202 is provided. In the context of the present network system 200, the network 202 may take any form including, but not limited to a local area network (LAN), a wide area network (WAN) such as the Internet, etc.

Coupled to the network 202 are a local host 204 and a remote host 206 which are capable of communicating over the network 202. In the context of the present description, such hosts 204, 206 may include a web server, desktop computer, lap-top computer, hand-held computer, printer or any other type of hardware/software. It should be noted that each of the foregoing components as well as any other unillustrated devices may be interconnected by way of one or more networks.

Figure 3:
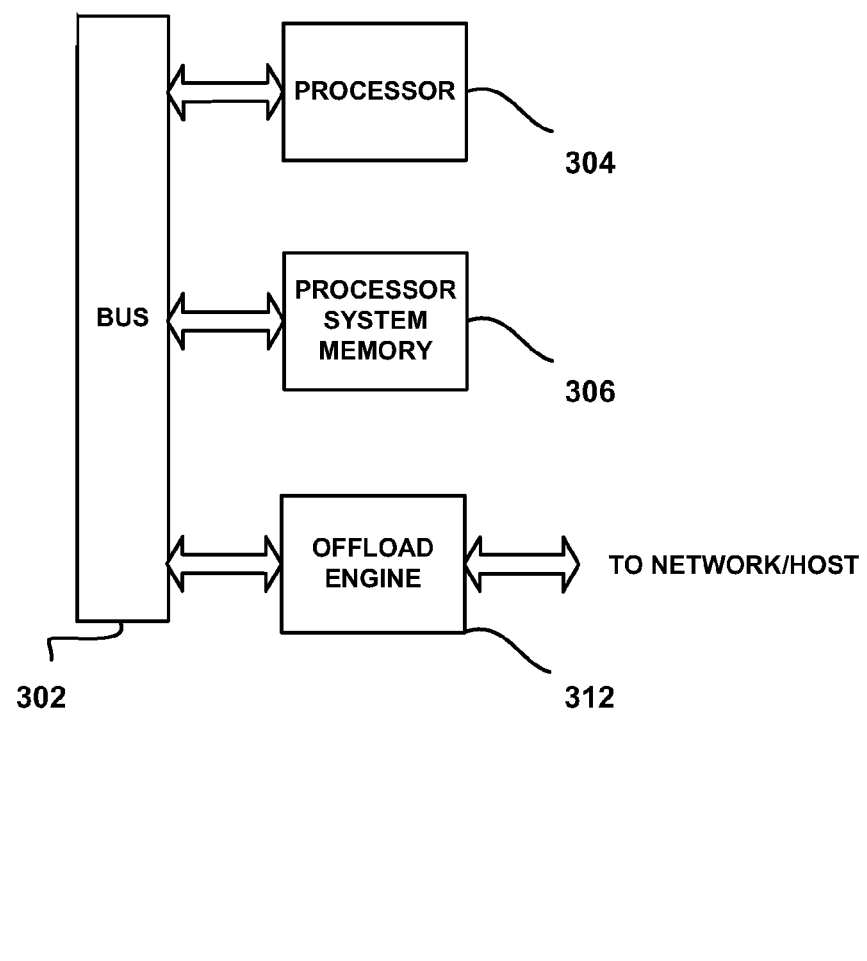
FIG. 3 illustrates an exemplary architecture in which one embodiment may be implemented.

FIG. 3 illustrates an exemplary architecture 300 in which one embodiment may be implemented. In one embodiment, the architecture 300 may represent one of the hosts 204, 206 of FIG. 2. Of course, however, it should be noted that the architecture 300 may be implemented in any desired context.

For example, the architecture 300 may be implemented in the context of a general computer system, a circuit board system, a game console system dedicated for entertainment purposes, a set-top box, a router, a network system, a storage system, an application-specific system, or any other desired system associated with the network 202.

As shown, the architecture 300 includes a plurality of components coupled via a bus 302. Included is at least one processor 304 for processing data. While the processor 304 may take any form, it may, in one embodiment, take the form of a central processing unit (CPU), a chipset (i.e. a group of integrated circuits designed to work and sold as a unit for performing related functions, etc.), or any other desired processing device(s) capable of processing data.

Further included is processor system memory 306 which resides in communication with the processor 304 for storing the data. Such processor system memory 306 may take the form of on or off-board random access memory (RAM), a hard disk drive, a removable storage drive (i.e., a floppy disk drive, a magnetic tape drive, a compact disk drive, etc.), and/or any other type of desired memory capable of storing the data.

In use, programs, or control logic algorithms, may optionally be stored in the processor system memory 306. Such programs, when executed, enable the architecture 300 to perform various functions. Of course, the architecture 300 may simply be hardwired.

Further shown is an offload engine 312 in communication with the processor 304 and the network (see, for example, network 202 of FIG. 2). In one embodiment, the offload engine 312 may remain in communication with the processor 304 via the bus 302. Of course, however, the offload engine 312 may remain in communication with the processor 304 via any mechanism that provides communication therebetween. The offload engine 312 may include a transport (i.e. TCP/IP) offload engine (TOE), or any integrated circuit(s) that is capable of managing the data transmitted in the network.

During operation, the offload engine 312 serves to work in conjunction with the processor 304 for establishing network connections while avoiding ramifications of memory overload [i.e. due to network denial-of-service (DoS) attacks, heavy traffic, etc.]. To accomplish this, an attempt to establish a connection on a network is initially identified. A portion of memory is then allocated for storing data associated with the connection. In the context of the remaining description, such memory may include any of the memory mentioned hereinabove (i.e. memory 306, etc.), memory associated with the offload engine 312, or absolutely any other memory associated with the architecture 300 and/or the network system 200.

During use, the aforementioned portion of the memory may be overwritten for the specific purpose of avoiding memory overload. It should be noted that the aforementioned functionality may be carried out in any desired manner that is capable of avoiding memory overload. More information will now be set forth regarding an exemplary method by which the offload engine 312 overwrites memory in the foregoing manner.

Figure 4A:
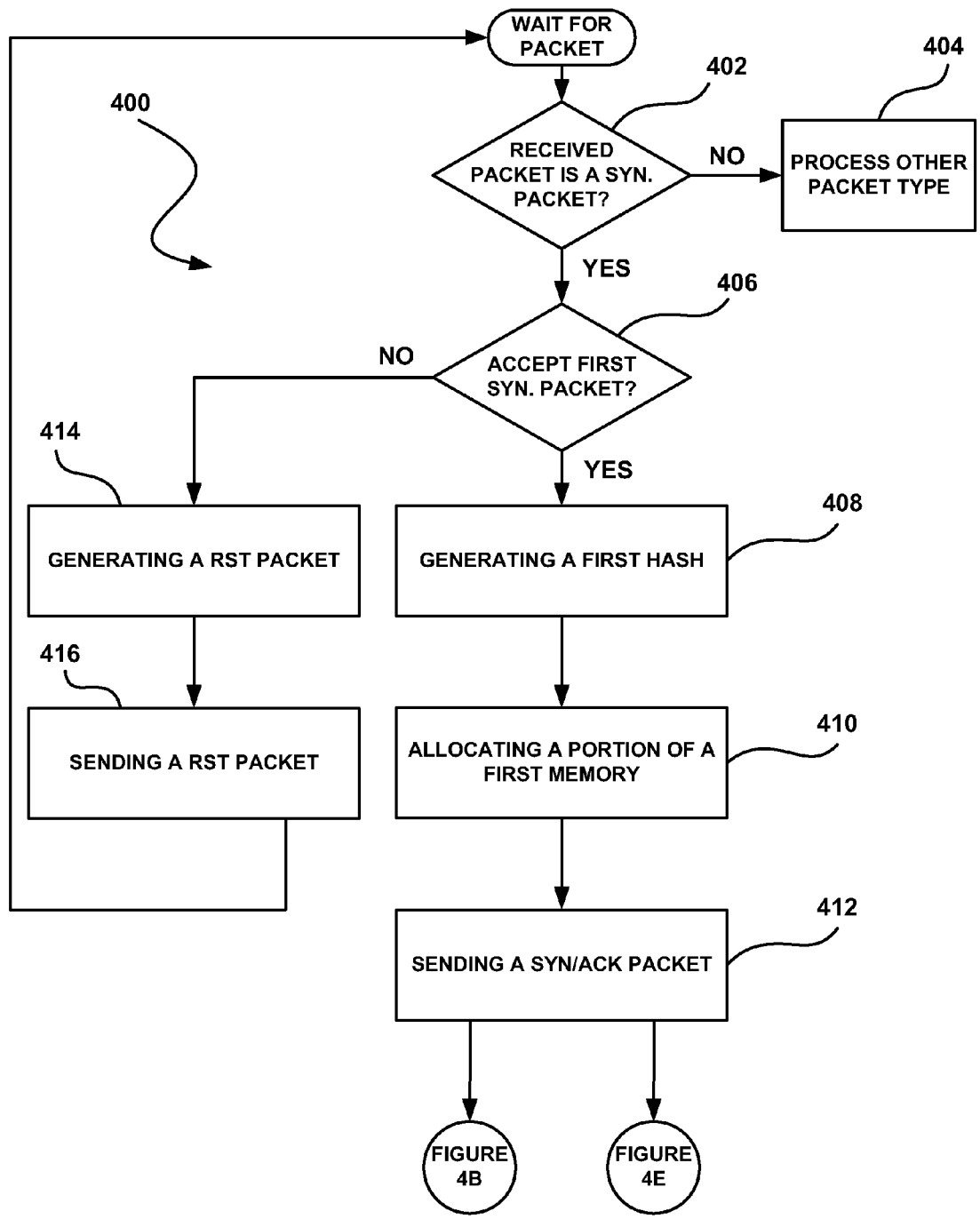
FIG. 4A illustrates an exemplary method for establishing network connections while avoiding ramifications of memory overload, in accordance with one embodiment.

FIG. 4A illustrates an exemplary method 400 for establishing network connections while avoiding ramifications of memory overload, in accordance with one embodiment. As an option, the method 400 may be carried out in the context of the exemplary architecture 300 of FIG. 3 and the network system 200 of FIG. 2. Of course, however, it should be noted that the method 400 may be implemented in any desired context. Moreover, while various functions may be attributed to exemplary components (i.e. like those set forth hereinabove), it is important to understand that the various functionality may be carried out by any desired entity.

Initially, in decision 402, it is determined whether a first synchronize (SYN) packet associated with a server socket is received by an offload engine (i.e. see, for example, offload engine 312 of FIG. 3) at a local host (i.e. see, for example, local host 204 of FIG. 2). In the context of the present description, a SYN packet may include any packet, signal, etc. that initiates the synchronization process necessary to establish a connection. In use, SYN packets may be marked by a flag within the packet. Moreover, a server socket is one endpoint of a two-way communication link between two programs running on a network. A socket may be bound to a port number so that a TCP layer can identify an application that data is destined to be sent.

If a SYN packet is not received per decision 402, the other packet type is processed in operation 404. If so, however, it is determined by a processor (i.e. see, for example, processor 304 of FIG. 2) of the local host whether the first SYN packet is to be accepted. Note decision 406. It should be noted that the above decision may be carried out based on a destination port associated with the SYN packet, and/or an interface on which the SYN packet was received.

Alternatively, the decision 406 to accept the first SYN packet may be made solely by the offload engine. The above decision may again be carried out based on a destination port associated with the SYN packet, and/or an interface on which the SYN packet was received.

If it is determined that the first SYN packet is not to be accepted, a reset (RST) packet is generated. Note operation 414. A RST packet is then transmitted back to the remote host which originated the first SYN packet. Note operation 416. Method 400 then resets. If, however, it is determined that the first SYN packet is to be indeed accepted, a first hash is created in operation 408 based on the parameters received in the first SYN packet. In the context of the present description, the hash may include a string of characters that is a shorter fixed-length value or key that represents the original string (i.e., in this case, the IP addresses and Port numbers in the first SYN packet). It should be noted that the hash may further include any identifier associated with at least one aspect of the first SYN packet. For example, the hash may be generated based on a pair of Internet Protocol (IP) addresses and ports associated with the first SYN packet.

Next, in operation 410, a first portion of a first memory is allocated for the server socket for a first-type of control block (i.e. a "half open" control block or HO-CB). Again, such memory may include any of the memory mentioned hereinabove (i.e. memory 306 of FIG. 3, etc.), memory associated with the offload engine, or absolutely any other memory associated with the architecture 300 and/or the network system 200.

In the context of the present description, the control block may include any information capable of being used to track a connection attempt and/or connection. Moreover, the first-type of control block, in particular, may include any information capable of being used to track a connection attempt. Just by way of example, the first-type of control block may include a handle, IP addresses, port numbers, a timestamp, and/or any information associated with the SYN packet.

In order to initiate the aforementioned allocation operation 410, the processor may issue an instruction block (IB) to the offload engine for the purpose of providing the information necessary to generate the first-type of control block. Given this IB, the offload engine is capable of allocating the first portion of the first memory in the foregoing manner. As will soon become apparent, the hash may be utilized as a pointer to the first-type of control block.

Alternatively, the offload engine itself may make the decision to accept the connection in the first SYN packet, and may obtain all the necessary information from the received first SYN packet and memory sources to generate the first-type of control block. The offload engine is then capable of allocating the first portion of the first memory in the foregoing manner.

With the memory allocated for the first-type of control block, the offload engine subsequently sends a synchronize acknowledgement (SYN/ACK) packet for the first SYN packet. Note operation 412. Such SYN/ACK packet may take the form of any signal that indicates that the first SYN packet has been received and that synchronization back to the remote host has been requested. Thereafter, the local host awaits the final component of the "TCP three-way opening handshake," the handshake ACK, which may take the form of any signal that acknowledges the receipt of the SYN/ACK packet at the remote host.

Figure 4B:
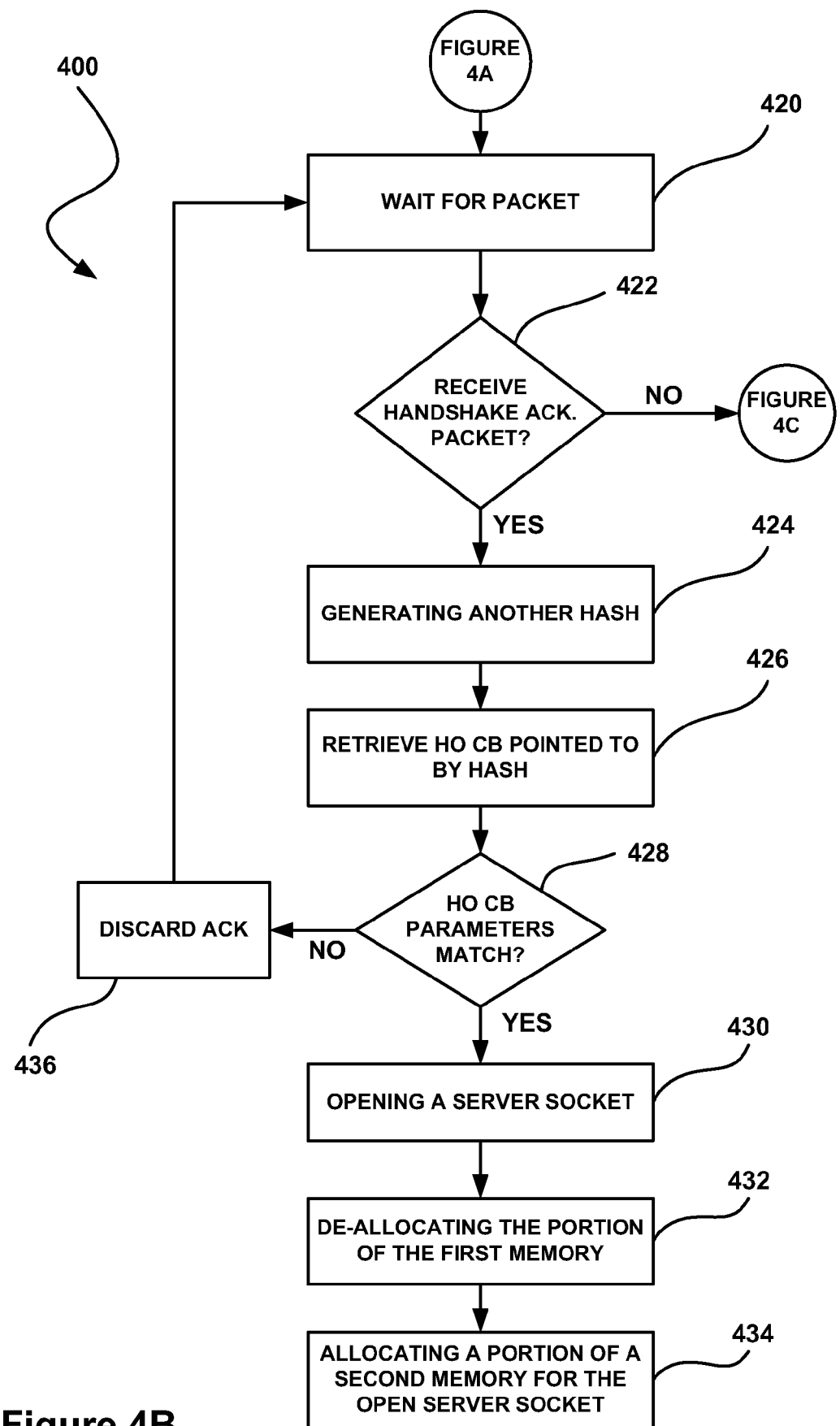
FIG. 4B illustrates a network connection establishment method in a case where a handshake acknowledgement (ACK) is received in response to the first synchronize (SYN) packet ACK of FIG. 4A, in accordance with one embodiment.
Figure 4C:
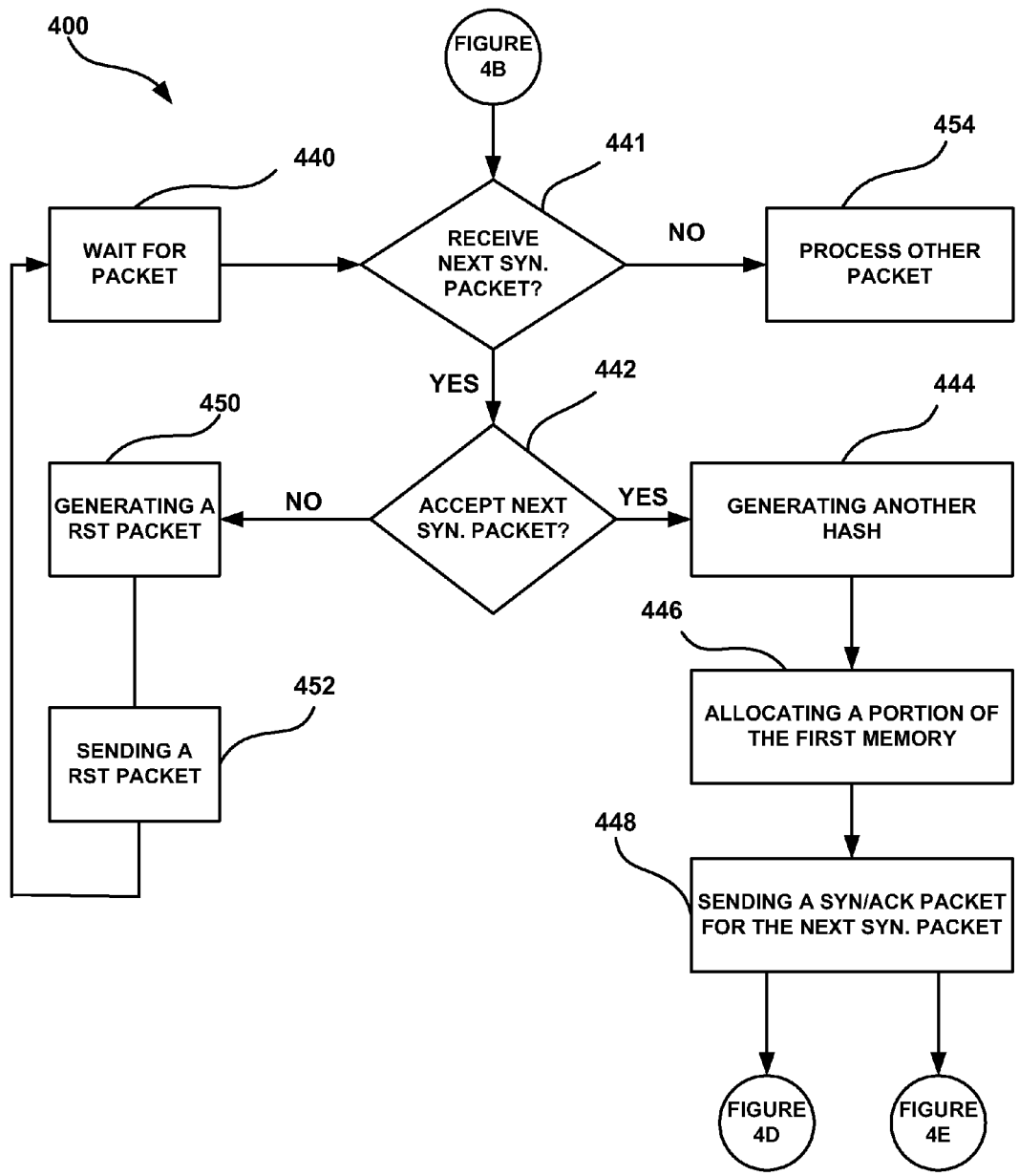
FIG. 4C illustrates a network connection establishment method in a case where another SYN packet is received after the first SYN packet of FIG. 4A, but before the handshake ACK is received in response to the first SYN/ACK packet.
Figure 4D:
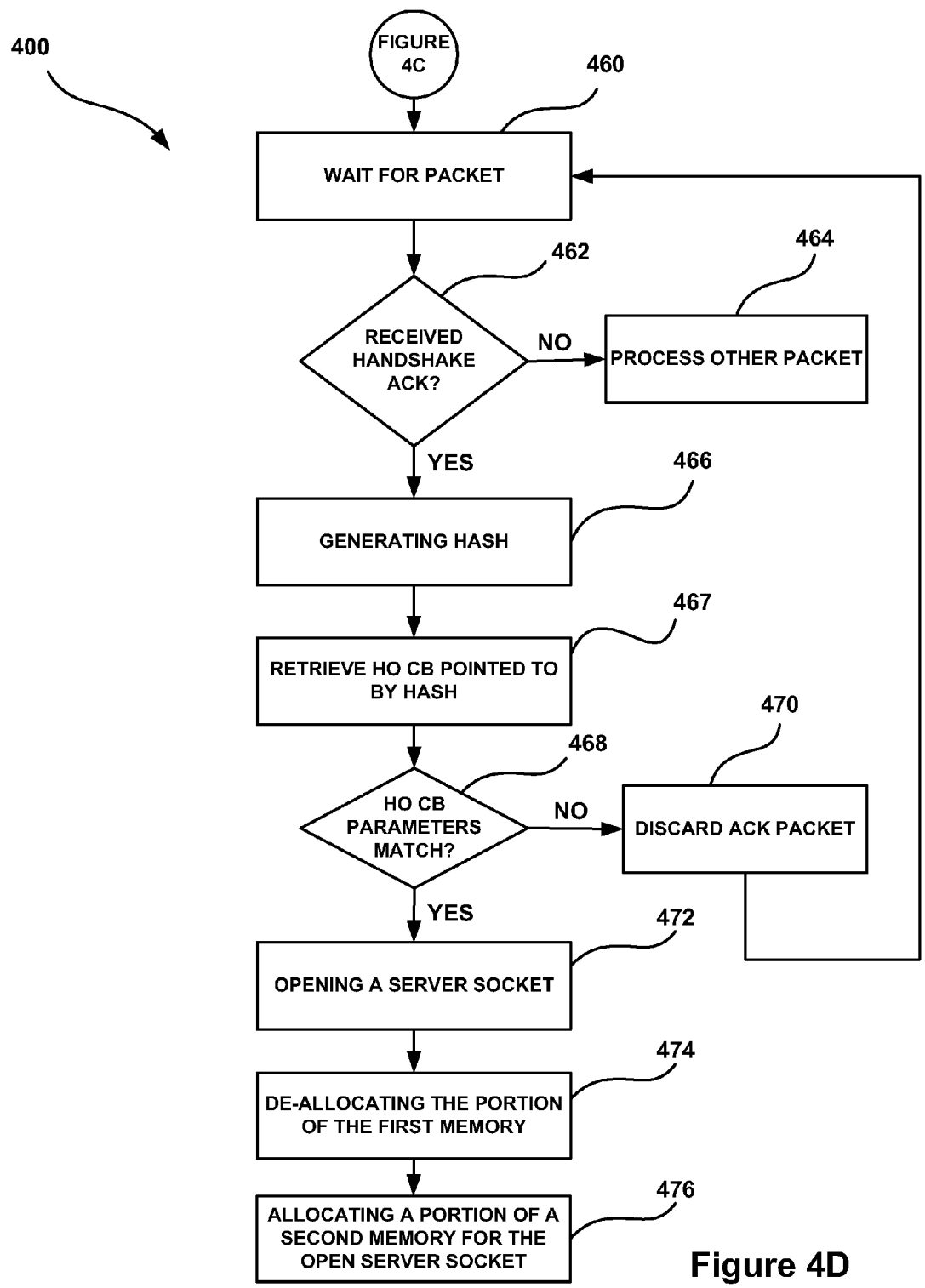
FIG. 4D illustrates a continuation of the network connection establishment method of FIG. 4C, in accordance with one embodiment.
Figure 4E:
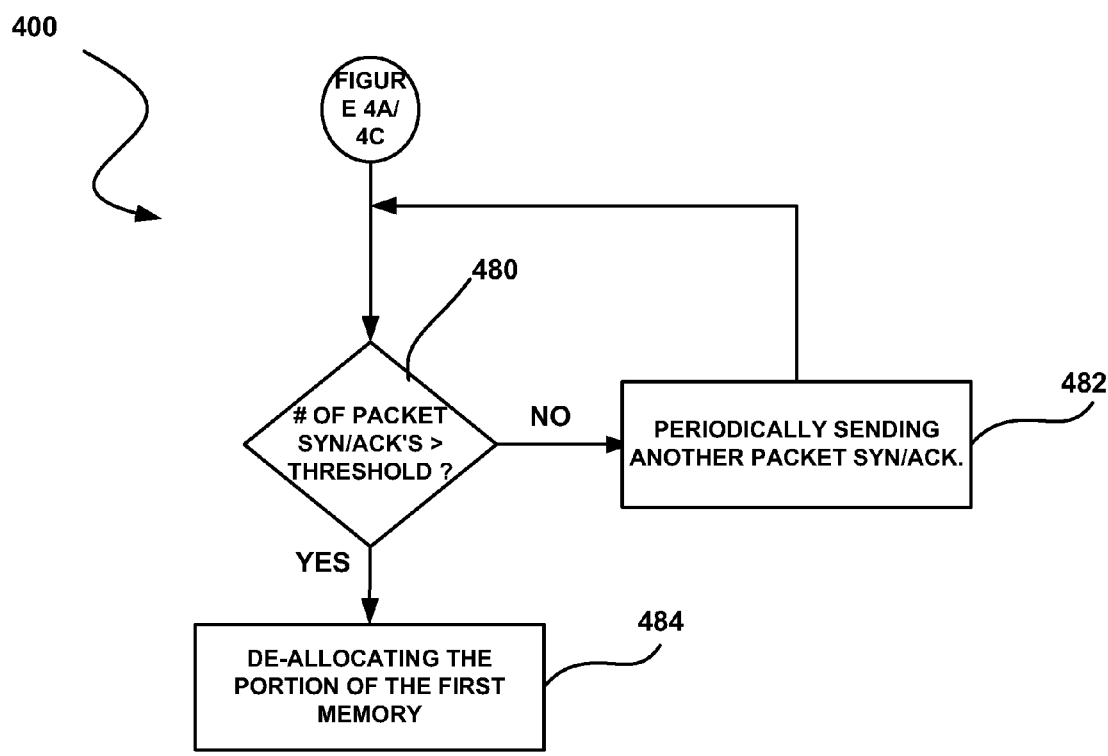
FIG. 4E illustrates a network connection establishment method in a case where no further handshake ACKs or other SYN packets are received for the connection attempt.

At this point, the functionality of the method 400 varies based on whether the handshake ACK is received, another SYN packet is received, or neither is received. The following figures are allocated to describe each of the foregoing case scenarios. For example, FIG. 4B illustrates a network connection establishment method in a case where a handshake ACK is received in response to the first SYN/ACK packet of FIG. 4A, in accordance with one embodiment. Moreover, FIGS. 4C and 4D illustrate a network connection establishment method in a case where another SYN packet is received after the first SYN packet of FIG. 4A, but before the handshake ACK is received in response to the first SYN/ACK packet. Still yet, FIG. 4E illustrates a network connection establishment method in a case where neither a handshake ACK nor another SYN packet is received.

Similar to before, the methods of FIGS. 4B-4E may be carried out in the context of the method 400 of FIG. 4, in association with the exemplary architecture 300 of FIG. 3 and the network system 200 of FIG. 2. Of course, however, it should be noted that the methods of FIGS. 4B-4E may be implemented in any desired independent context. Moreover, while various functions may be attributed to exemplary components (i.e. like those set forth hereinabove), it is important to understand that the various functionality may be carried out by any desired entity.

With reference first to FIG. 4B, it is determined by the offload engine, after waiting for a packet in operation 420, whether the packet received is an ACK packet. Note decision 422. If the packet is not an ACK packet, further checks are done to see what type of packet was received. See FIG. 4C. If the received packet is an ACK packet, a hash is generated, as indicated in operation 424. Such hash may be generated in a manner similar, if not identical, to that set forth hereinabove regarding the SYN packet. For example, the hash may be generated based on a pair of IP addresses and ports associated with the handshake ACK packet.

Parameters in the first-type control block (i.e. a HO-CB) as identified by the hash of the received ACK packet are then retrieved, as indicated in operation 426. The parameters retrieved from the aforementioned HO-CB are then used to determine if the received ACK is the handshake ACK. If it is, then the parameters in the HO-CB are compared to those received in the handshake ACK packet to see if the received handshake ACK packet belongs to the same connection attempt as stored in the identified HO-CB. See decision 428. If the parameters do not match, the received handshake ACK is discarded, as indicated by operation 436, and the method 400 resets back to waiting for received packets. If the parameters do match, it is then confirmed that the final component of the "TCP three-way opening handshake" is complete. To this end, the server socket is opened to produce an open socket. See operation 430.

Moreover, in order to free up the first memory for tracking additional connection attempts, the portion of the first memory that was previously allocated for the first SYN packet is now de-allocated. Note operation 432. By this de-allocation, the first-type of control block is invalidated.

To facilitate the opening, the parameters read from the HO-CB in operation 426 are used to generate a second-type of control block (i.e. an Open Control Block or Open CB). See operation 434. The Open CB is used to track the state of the now open connection. Similar to the first-type of control block, the second-type of control block may include any information capable of being used to track and maintain an open connection. However, since more information is often required to track open connections, the second-type of control block is larger in size than the first-type of control block.

Moreover, the second memory which stores the second-type of control block may include any of the memory mentioned hereinabove (i.e. memory 306 of FIG. 3, etc.), memory associated with the offload engine, or absolutely any other memory associated with the architecture 300 and/or the network system 200. It should be noted, however, that the second memory is logically (and possibly even physically, in addition to logically) maintained separate, or independent, from the first memory such that overload of the first memory (i.e. due to an excessive number of connection attempts, attacks, etc.) does not affect the tracking of the open connections by the second memory. Since the second-type of control block is larger in size than the first-type of control block, the second memory may accommodate this by being larger in size than the first memory.

As mentioned previously, if the appropriate handshake ACK is not received (as determined in decisions 422 of FIG. 4B), it is then determined whether another SYN packet is received.

With reference now to FIG. 4C, it is first determined whether another SYN packet is received by the offload engine. Note decision 441. If another SYN packet is not received per decision 441, the other packet type is processed in operation 454. If so, however, similar to decision 406 of FIG. 4A, it is then determined whether the next SYN packet is to be accepted in decision 442. As noted for the first received SYN packet, the decision to accept the second received SYN packet may be made by the local host or by the offload engine. If the second received SYN packet is not accepted, a RST packet is generated, as indicated by operation 450, and transmitted to the remote host that originated the second received SYN packet. See operation 452. The method 400 then resets back to wait for the next packet as indicated by operation 440.

If the second received SYN packet is accepted by decision 442, a hash is generated for the aforementioned SYN packet, as indicated by operation 444. If the hash generated in operation 444 differs from the hash generated for the first received SYN packet, a different portion of the first memory is allocated to the second received SYN packet. See operation 446.

If the hash generated in operation 444 coincides with the hash generated for the first received SYN packet, the portion of memory allocated in the first memory for the first received SYN packet will be overwritten by the connection parameters for the second received SYN packet in operation 446. In other words, the parameters of the overwritten control block associated with the first SYN packet may be replaced with those of the second SYN packet in the case of a hash collision.

In cases where the second SYN packet is a retransmitted SYN packet by a remote host, the parameters are not overwritten in the CB since the second SYN packet is for the same connection attempt. When the hashes for received SYNs coincide, either the first or second received SYN packet (or both) may be a component of an attack, or it may be caused by the remote host retransmitting a SYN packet. If more and more SYN packets are received without connections completing the "TCP three-way opening handshake", the first memory is at risk of being overloaded. In any case, allowing subsequently received accepted SYN packets whose hash values coincide with previously received SYN packets to overwrite the corresponding portion of the first memory ensures that the first memory will not be overloaded.

Regardless of whether the hash for the second received SYN packet coincided with the first received SYN packet, if the SYN packet is accepted, a SYN/ACK packet is generated and transmitted back to the remote host that originated the second received SYN packet, as indicated in operation 448.

With reference now to FIG. 4D, the method 400 continues from FIG. 4C to accommodate the next packet by waiting for the same in operation 460. In particular, it is first determined whether the handshake ACK for a SYN packet has been received. Note decision 462. If it is not a handshake ACK, the method processes the received packet accordingly, as indicated in operation 464.

If, however, the received packet is an ACK, a hash is generated. See operation 466. The HO-CB pointed to by the generated hash is then retrieved, as indicated by operation 467. The parameters retrieved from the HO-CB are then used to determine if the received ACK is a handshake ACK. If so, then the parameters from the handshake ACK are compared to the parameters contained within the HO-CB.

If they do not match, the ACK packet is discarded, and the process reverts back to waiting for a packet. See operation 470. This will be the case where a handshake ACK for a first SYN packet is received after a second SYN packet is received that had a hash which coincided with the first received SYN packet. In this case, the first received SYN's HO-CB parameters would have been overwritten when the second-received SYN was received. Therefore, when the handshake ACK for the first received SYN is received and the corresponding HO-CB fetched, the parameters fetched would be those of the second received SYN packet and would therefore not match the parameters of the handshake ACK for the first received SYN packet.

If the parameters fetched from the HO-CB do match the parameters in the received handshake ACK in decision 468, the process follows the same steps as outlined in FIG. 4B. Specifically, a server socket is opened in operation 472. The portion in first memory used to store the HO-CB of the connection associated with the received handshake ACK is de-allocated, as indicated in operation 474. Further, a portion in second memory is allocated to track and maintain the now open connection, as indicated in operation 476.

FIG. 4E illustrates the case where neither a handshake ACK of FIGS. 4B/4D nor another SYN packet of FIG. 4C is received. In use, additional SYN/ACK packets are periodically resent in response to SYN packets, in an effort to elicit the appropriate handshake ACK response. Note operation 482. As an option, the SYN/ACK packets can be resent based on a timestamp associated with the corresponding control block. If, after a number of SYN/ACK retransmits, no handshake ACK response is received from the peer, the offload engine may deem that the connection attempt has been aborted. See decision 480. The number of retransmits attempted may be pre-determined and/or user-configured. If the connection attempt is deemed to be aborted, the portion in first memory allocated for the connection attempt is de-allocated and free to be used for future connection attempts. See operation 484.

Figure 5:
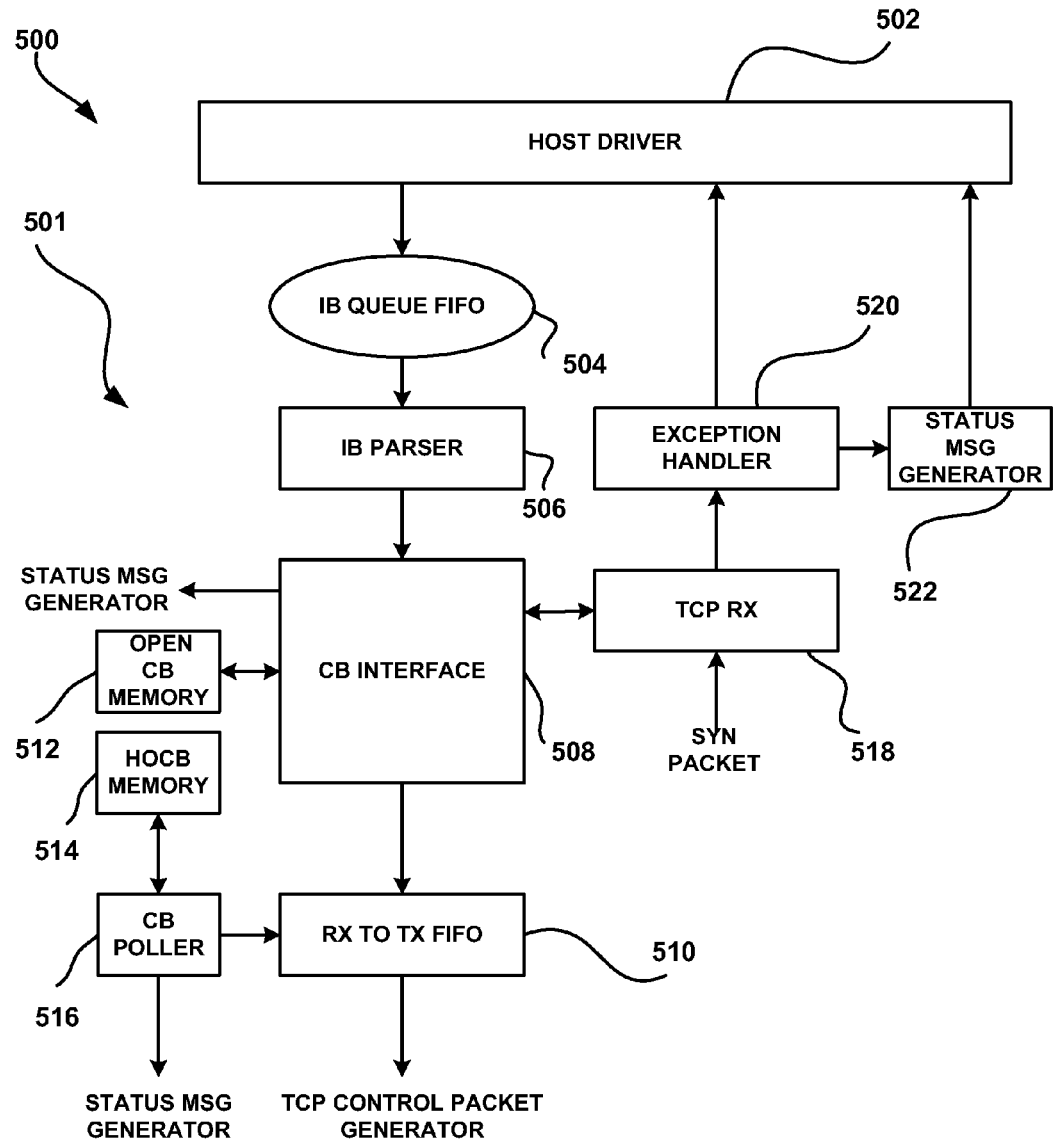
FIG. 5 illustrates an exemplary design and operation for establishing network connections while avoiding ramifications of memory overload, in accordance with an exemplary embodiment, for the case where the decision to accept SYN packets are performed by a host driver.

FIG. 5 illustrates an exemplary design and operation 500 for establishing network connections while avoiding ramifications of memory overload, in accordance with an exemplary embodiment. As an option, the design and operation 500 may be carried out in the context of the disclosure of the previous figures. Of course, however, it should be noted that the design and operation 500 may be implemented in any desired context. Most importantly, the exemplary design and operation 500 is set forth for illustrative purposes only, and should not be considered as limiting in any manner. In the context of the present description, the host driver is defined as a SW component(s) residing on the local host that works in conjunction with the offload engine.

As shown, the exemplary design and operation 500 shows a host driver 502 associated with a processor which, in turn communicates with an offload engine 501 which comprising a plurality of exemplary components. For example, the offload engine 501 is shown to include a receiver 518, an exception handler 520, a control block (CB) poller 516, an instruction block (IB) FIFO queue 504, a status message generator 522, an IB parser 506, CB memory 512/514, a CB interface 508, a first-in-first-out (FIFO) buffer 510, and a data packet generator (unillustrated), which are coupled as shown. The functionality of the various components will be set forth in greater detail hereinafter during a discussion of the use of the exemplary design and operation 500.

In use, the offload engine 501 receives a SYN packet via the receiver 518. A checksum associated with the SYN packet is then validated. If the validation succeeds, the SYN packet is sent as an exception packet to the host via the host driver 502, utilizing the exception handler 520. A status message is also generated by the status message generator 522, and sent to the host driver 502 indicating that a SYN packet has been received.

At the host, the driver 502 examines the SYN packet by reviewing the destination port, IP address, and an interface on which it was received to determine if it is associated with a connection that should be opened. If Internet protocol security (IPSEC) is being used, the protection used (or not used) may be validated in a policy table.

If the driver 502 wishes to allow the instant connection, it issues a SYNACK IB. This IB may then be hardware processed by the offload engine 501, by first being stored/queued utilizing the FIFO queue 504 and then being parsed utilizing the IB parser 506. The IB may contain all the information needed to generate a half open (HO) control block (CB) for the connection, including a CB handle to be used once the socket moves to an established state.

The offload engine 501, once it receives the SYNACK IB, may create an HO CB utilizing the interface 508 and related components, and send out a SYN/ACK packet in response to the SYN packet. When a handshake ACK is received from the remote host, the HO CB may be transferred to an open CB using the handle provided. At that point, a "socket established" status message may be generated.

If, however, the host receives another SYN packet that generates a hash that coincides with a previously received connection attempt before the previous connection reaches the established state, the previous HO CB is overwritten with the new connection attempt parameters. This provides the overload protection for the offload engine 501. A status message may be sent to the host driver 502 in this situation indicating that the CB handle used in the previous HO CB may be freed and used again. At this point, the CB poller 516 may handle SYN/ACK packet retransmissions, as necessary in the manner set forth hereinabove.

Figure 6:
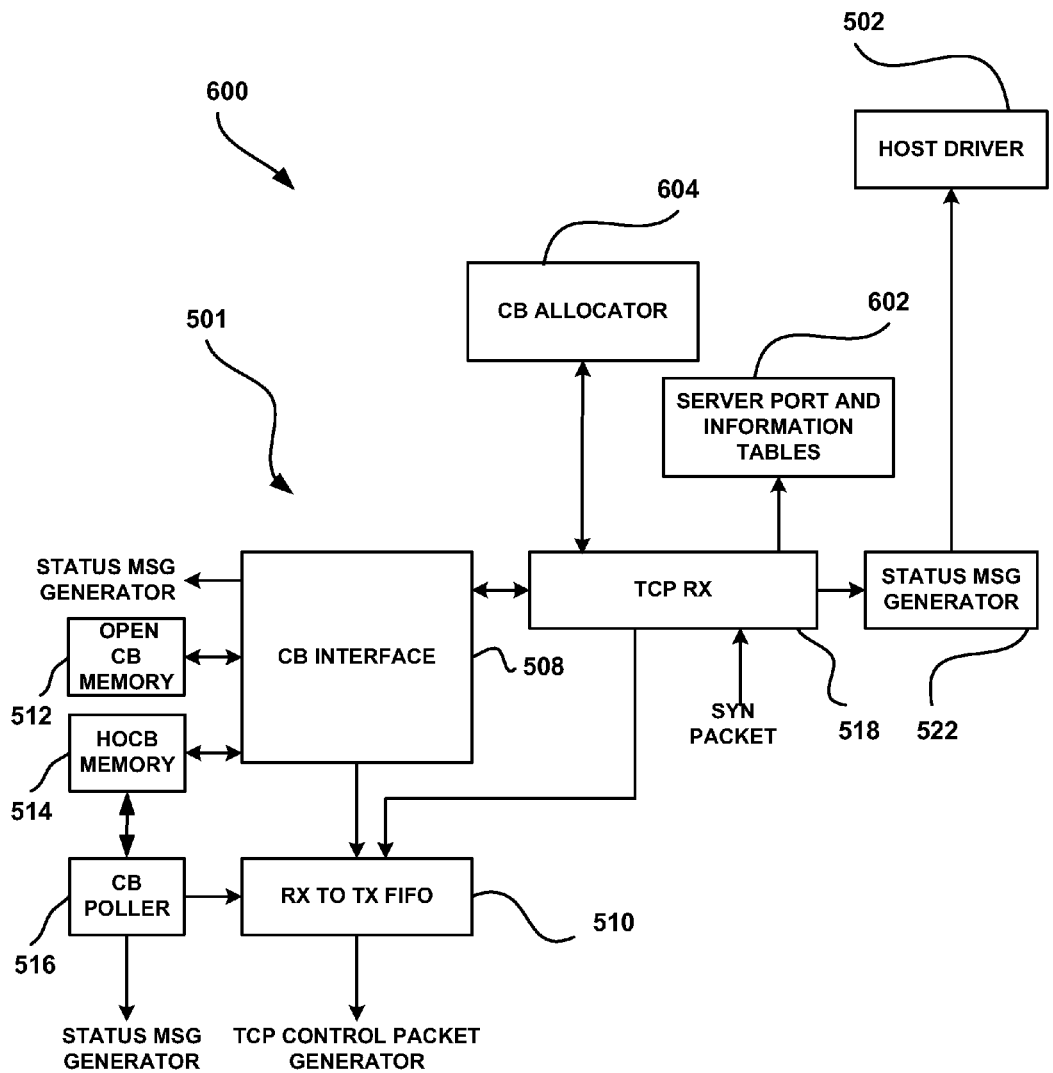
FIG. 6 illustrates an exemplary design and operation for establishing network connections while avoiding ramifications of memory overload, in accordance with an exemplary embodiment, for the case where the decision to accept SYN packets are performed by the offload engine.

FIG. 6 illustrates an alternative design and operation 600 for establishing network connections while avoiding ramifications of memory overload, in accordance with an exemplary embodiment. As an option, the design and operation 600 may be carried out in the context of the disclosure of the previous figures. Of course, however, it should be noted that the design and operation 600 may be implemented in any desired context. Most importantly, the exemplary design and operation 600 is set forth for illustrative purposes only, and should not be considered as limiting in any manner.

As shown, the exemplary design and operation 600 shows the same components as depicted in FIG. 5, with the addition of a server port and information table 602, and a CB allocator 604.

In use, the offload engine 501 receives a SYN packet via the receiver 518. A checksum associated with the SYN packet is then validated. If the validation succeeds, the TCP port specified by the SYN packet is checked in the server port and information table 602.

If the port is deemed to be authorized to accept connections, a HO-CB is created in HOCB memory 514 using the parameters received in the SYN packet and those associated with the destination port in the server port and information table 602. A SYN/ACK response is then requested by the receiver 518 via the FIFO 510. When the handshake ACK for the connection attempt is received from the remote host, the HO CB may be transferred to an open CB using a handle provided by the CB allocator 604. At that point, a "socket established" status message may be generated via the status message generator 522.

If, however, the offload engine 501 receives another SYN packet before the previous connection reaches the established state, the previous HO CB may be overwritten with the new connection attempt parameters if the hash generated by the second received SYN packet coincides with the hash of the received SYN of the previous connection attempt. This again provides the overload protection for the offload engine 501. A status message may not need to be sent to the host driver for this case, as the host driver may only care to be informed when connections are established.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A method for managing connections over a network, comprising:
   receiving a first synchronize packet associated with a server socket;
   determining that the first synchronize packet is to be accepted, utilizing a processor, and in response generating a first hash associated with the first synchronize packet, based on a pair of Internet Protocol (IP) addresses and ports associated with the first synchronize packet;
   allocating a first portion of a first memory for the server socket for a first-type of control block including a handle, IP addresses, TCP ports, and a timestamp, wherein the first hash is utilized as a pointer to the first-type of control block;
   sending a packet acknowledgement of the first synchronize packet;
   receiving an acknowledgement packet and in response:
      generating a second hash associated with the acknowledgement packet, based on a pair of IP addresses and ports associated with the acknowledgement packet,
      retrieving parameters in the first-type of control block pointed to by the second hash, and
      determining that parameters in the retrieved first-type of control block indicate that the received acknowledgement packet is a handshake acknowledgement packet for a connection attempt and parameters in the received handshake acknowledgement packet match the parameters in the retrieved first-type of control block and in response:
         opening the server socket to produce an open socket, de-allocating the first portion of the first memory, and
         allocating a second portion of a second memory for the open socket for a second-type of control block that is larger than the first-type of control block; and determining that a second synchronize packet is received with a hash that matches the first hash, and in response overwriting the first portion of the first memory for a server socket associated with the second synchronize packet, else allocating a second portion of the first memory for the server socket associated with the second synchronize packet;

wherein the second memory is allocated for the open socket so that overload of the first memory does not affect the open socket.

2. The method of claim 1, wherein the first synchronize packet initiates a synchronization process for establishing a connection.

3. The method of claim 1, wherein the server socket associated with the first synchronize packet is one endpoint of a two-way communication link between two programs running on a network.

4. The method of claim 1, wherein the first synchronize packet is identified as a synchronize packet based on a flag within the packet.

5. The method of claim 1, further comprising determining whether the first synchronize packet is to be received based on a destination port associated with the first synchronize packet.

6. The method of claim further comprising determining whether the first synchronize packet is to be received based on an interface on which the first synchronize packet was received.

7. The method of claim 1, wherein determining that the first synchronize packet is to be accepted is performed by a processor of a local host at which the first synchronize packet was received.

8. The method of claim 1, wherein determining that the first synchronize packet is to be accepted is performed by an offload engine at a local host at which the first synchronize packet was received.

9. The method of claim 1, wherein the pair of IP addresses and the ports include parameters received in the first synchronize packet.

10. The method of claim 1, wherein a processor of a local host issues an instruction block to an offload engine of the local host for providing information utilized in generating the first-type of control block, and the offload engine utilizes the instruction block to allocate the first portion of the first memory for the first-type of control block.

11. The method of claim 1, wherein an offload engine of a local host obtains information from the first synchronize packet and memory sources to generate the first-type of control block for which the first portion of the first memory is allocated.

12. The method of claim 1, wherein the packet acknowledgement of the first synchronize packet is sent by an offload engine.

13. The method of claim 1, wherein the packet acknowledgement of the first synchronize packet indicates that the first synchronize packet has been received by a local host and that synchronization back to a remote host has been requested.

14. The method of claim 13, wherein the local host determines whether the acknowledgement packet has been received, the acknowledgement packet acknowledging receipt by a remote host of the packet acknowledgement.

15. The method of claim 1, wherein if the parameters in the received handshake acknowledgement packet match the parameters in the retrieved first-type of control block, it is determined that the received handshake acknowledgement packet belongs to a same connection attempt as stored in the retrieved first-type of control block.

16. The method of claim 1, wherein the first portion of the first memory is de-allocated for freeing up the first memory to track additional connection attempts.

17. The method of claim 1, wherein the de-allocation of the first portion of the first memory invalidates the first-type of control block.

18. A computer program product embodied on a non-transitory computer readable medium, comprising:
computer code for receiving a first synchronize packet associated with a server socket;
computer code for generating a first hash associated with the first synchronize packet, based on a pair of Internet Protocol (IP) addresses and ports associated with the first synchronize packet, in response to a determination that the first synchronize packet is to be accepted;
computer code for allocating a first portion of a first memory for the server socket for a first-type of control block including a handle, IP addresses, TCP ports, and a timestamp, wherein the hash is utilized as a pointer to the first-type of control block;
computer code for sending a packet acknowledgement of the first synchronize packet;
computer code for, in response to an acknowledgement packet being received:
generating a hash associated with the acknowledgement packet, based on a pair of IP addresses and ports associated with the acknowledgement packet,
retrieving parameters in the first-type control block pointed to by the generated hash, and
determining that parameters in the retrieved first-type control block indicate that the received acknowledgement packet is a handshake acknowledgement packet for the connection attempt and the parameters in the received handshake acknowledgement packet match the parameters in the retrieved first-type control block, and in response:
opening the server socket to produce an open socket, de-allocating the portion of the first memory, and
allocating a portion of a second memory for the open socket for a second-type of control block that is larger than the first-type of control block; and
computer code for overwriting the portion of the first memory for a server socket associated with the second synchronize packet if a second synchronize packet is received with a hash that matches the first hash, else allocating a second portion of the first memory for the server socket associated with the second synchronize packet;
wherein the computer program product is operable such that the second memory is allocated for the open socket so that overload of the first memory does not affect the open socket.

19. A system, comprising:
a processor for:
receiving a first synchronize packet associated with a server socket;
determining that the first synchronize packet is to be accepted, and in response generating a first hash associated with the first synchronize packet, based on a pair of Internet Protocol (IP) addresses and ports associated with the first synchronize packet;
allocating a first portion of a first memory for the server socket for a first-type of control block including a handle, IP addresses, TCP ports, and a timestamp, wherein the first hash is utilized as a pointer to the first-type of control block;

sending a packet acknowledgement of the first synchronize packet;
receiving an acknowledgement packet and in response:
  generating a second hash associated with the acknowledgement packet, based on a pair of IP addresses and ports associated with the acknowledgement packet,
  retrieving parameters in the first-type of control block pointed to by the second hash, and
  determining that parameters in the retrieved first-type of control block indicate that the received acknowledgement packet is a handshake acknowledgement packet for a connection attempt and parameters in the received handshake acknowledgement packet match the parameters in the retrieved first-type of control block and in response:
    opening the server socket to produce an open socket, de-allocating the first portion of the first memory, and allocating a second portion of a second memory for the open socket for a second-type of control block that is larger than the first-type of control block; and
  determining that a second synchronize packet is received with a hash that matches the first hash, and in response overwriting the first portion of the first memory for a server socket associated with the second synchronize packet, else allocating a second portion of the first memory for the server socket associated with the second synchronize packet;
wherein the system is operable such that the second memory is allocated for the open socket so that overload of the first memory does not affect the open socket.

20. The system of claim 1, wherein the processor is coupled to memory via a bus.

\* \* \* \* \*

UNITED STATES PATENT AND TRADEMARK OFFICE
CERTIFICATE OF CORRECTION

| | | |
|---|---|---|
| PATENT NO. | : 7,979,526 B2 | Page 1 of 1 |
| APPLICATION NO. | : 12/649221 | |
| DATED | : July 12, 2011 | |
| INVENTOR(S) | : Minami et al. | |

It is certified that error appears in the above-identified patent and that said Letters Patent is hereby corrected as shown below:

Col. 11, line 24, please insert --1,-- after "claim".

Signed and Sealed this
Eighteenth Day of October, 2011

David J. Kappos
*Director of the United States Patent and Trademark Office*